United States Patent
Cho et al.

(10) Patent No.: US 10,741,822 B2
(45) Date of Patent: *Aug. 11, 2020

(54) POUCH-TYPE SECONDARY BATTERY INCLUDING ELECTRODE LEAD HAVING ELECTRICAL CURRENT LIMITING FUNCTION

(71) Applicant: LG Chem, Ltd., Seoul (KR)

(72) Inventors: Seung-Su Cho, Daejeon (KR); Jung-Jin Kim, Daejeon (KR); Jin-Young Kim, Daejeon (KR); Gi-Su Jeong, Daejeon (KR); Won-Seok Jeong, Daejeon (KR); Seung-Don Choi, Daejeon (KR); Won-Pill Hwang, Daejeon (KR)

(73) Assignee: LG Chem, Ltd. (KR)

( * ) Notice: Subject to any disclaimer, the term of this patent is extended or adjusted under 35 U.S.C. 154(b) by 222 days.

This patent is subject to a terminal disclaimer.

(21) Appl. No.: 15/557,248

(22) PCT Filed: May 4, 2016

(86) PCT No.: PCT/KR2016/004765
§ 371 (c)(1),
(2) Date: Sep. 11, 2017

(87) PCT Pub. No.: WO2016/178539
PCT Pub. Date: Nov. 10, 2016

(65) Prior Publication Data
US 2018/0062148 A1  Mar. 1, 2018

(30) Foreign Application Priority Data

May 7, 2015  (KR) .......................... 10-2015-0063768
May 7, 2015  (KR) .......................... 10-2015-0063769

(51) Int. Cl.
*H01M 2/34* (2006.01)
*H01M 2/08* (2006.01)
(Continued)

(52) U.S. Cl.
CPC ......... *H01M 2/345* (2013.01); *H01M 2/0212* (2013.01); *H01M 2/04* (2013.01);
(Continued)

(58) Field of Classification Search
None
See application file for complete search history.

(56) References Cited

U.S. PATENT DOCUMENTS 6,187,472 B1 * 2/2001 Shiota ................. H01M 2/0212
    429/127
6,713,209 B1 * 3/2004 Naskali .................. H01M 2/34
    429/56
(Continued)

FOREIGN PATENT DOCUMENTS

EP    0961331 A1   12/1999
EP    2672549 A2   12/2013
(Continued)

OTHER PUBLICATIONS

Supplementary European Search Report for Application No. EP16789645 dated Aug. 29, 2018.
(Continued)

*Primary Examiner* — Devina Pillay
(74) *Attorney, Agent, or Firm* — Lerner, David, Littenberg, Krumholz & Mentlik, LLP

(57) ABSTRACT

Provided is a pouch-type secondary battery that includes an electrode assembly equipped with an electrode tab, an electrode lead connected to the electrode tab, a pouch housing accommodating and sealing the electrode assembly such that the electrode lead is partially exposed, and first and
(Continued)

second sealants within the pouch housing. The electrode lead includes a joint portion joined to the electrode tab, a terminal portion exposed to an outside of the pouch housing and a fuse portion between the joint portion and the terminal portion. The fuse portion includes a separating groove and a breaking portion connected to the separating groove for separating the terminal portion from the joint portion. The first sealant and the second sealant have shapes that are different from each other such that, when the pressure inside the secondary battery is increased, a stress applied to the pouch housing causes the breaking portion to break.

20 Claims, 13 Drawing Sheets

(51) Int. Cl.
    *H01M 2/26* (2006.01)
    *H01M 2/06* (2006.01)
    *H01M 2/02* (2006.01)
    *H01M 2/04* (2006.01)
    *H01M 2/12* (2006.01)
    *H01M 2/30* (2006.01)
    *H01M 2/14* (2006.01)

(52) U.S. Cl.
    CPC ............... *H01M 2/06* (2013.01); *H01M 2/08* (2013.01); *H01M 2/1235* (2013.01); *H01M 2/1294* (2013.01); *H01M 2/26* (2013.01); *H01M 2/30* (2013.01); *H01M 2/0202* (2013.01); *H01M 2/14* (2013.01)

(56) References Cited

U.S. PATENT DOCUMENTS

| 2004/0126650 | A1  | 7/2004  | Kim |
| 2010/0216016 | A1* | 8/2010  | Seino ................... H01M 2/021 429/185 |
| 2013/0216871 | A1  | 8/2013  | Lee et al. |
| 2014/0011060 | A1  | 1/2014  | Yang et al. |
| 2015/0079429 | A1* | 3/2015  | Han ..................... H01M 2/345 429/61 |
| 2016/0028068 | A1  | 1/2016  | Yang et al. |

FOREIGN PATENT DOCUMENTS

| JP | 2000067846 A | 3/2000 |
| JP | 2008177084 A | 7/2008 |
| JP | 2009110812 A | 5/2009 |
| KR | 20090060497 A | 6/2009 |
| KR | 20090131573 A | 12/2009 |
| KR | 20120039181 A | 4/2012 |
| KR | 20130117637 A | 10/2013 |
| KR | 20140139793 A | 12/2014 |
| KR | 20150034637 A | 4/2015 |

OTHER PUBLICATIONS

Search report from International Application No. PCT/KR2016/004765, dated Aug. 19, 2016.

* cited by examiner

POUCH-TYPE SECONDARY BATTERY INCLUDING ELECTRODE LEAD HAVING ELECTRICAL CURRENT LIMITING FUNCTION

CROSS-REFERENCE TO RELATED APPLICATIONS

The present application is a national phase entry under 35 U.S.C. § 371 of International Application No. PCT/KR2016/004765, filed May 4, 2016, which claims priority from Korean Patent Application Nos. 10-2015-0063768 and 10-2015-0063769, both filed on May 7, 2015, in the Republic of Korea, the disclosures of which are incorporated herein by reference.

TECHNICAL FIELD

The present disclosure relates to a pouch-type secondary battery, more particularly to a pouch-type secondary battery with improved overcharge safety due to an improved structure of an electrode lead joined to an electrode tab.

BACKGROUND ART

Secondary batteries which are highly applicable to various products and exhibit superior electrical properties such as high energy density, etc. are commonly used not only in portable devices but also in electric vehicles (EVs) or hybrid vehicles (HVs) driven by electrical power sources. The secondary battery is drawing attentions as a new energy source for enhancing environment friendliness and energy efficiency in that the use of fossil fuels can be reduced greatly and no byproduct is generated during energy consumption.

The secondary battery can be classified into various kinds depending on type, structure, etc., including a can-type battery in which its internal components are accommodated in a hard metal case. Recently, demand on a prismatic battery and a pouch-type battery with small thicknesses is increasing as the mobile devices are becoming smaller in size. In particular, the pouch-type secondary battery which is advantageous in terms of easy shape changing, low manufacturing cost and light weight is gaining a lot of attentions. Also, the pouch-type secondary battery is being developed and commercialized as a power source for electric vehicles or hybrid electric vehicles requiring high output and large capacity.

The pouch-type secondary battery includes an electrode assembly, an electrode tab extending from the electrode assembly, an electrode lead soldered to the electrode tab and a pouch housing consisting of a polymer resin and an aluminum laminate sheet which accommodates the electrode assembly. When the temperature inside the pouch-type secondary battery is increased due to overcharging exceeding permitted current or voltage, internal short circuits, etc., the internal pressure is increased due to evaporation of an electrolyte, etc., leading to swelling of the pouch housing. When this swelling phenomenon occurs, a local short circuit can occur as the battery is deformed. In extreme situations, the battery may catch fire or explode.

Therefore, one of main research topics on the pouch-type secondary battery is to improve safety. In this regard, methods for venting a gas generated inside the pouch housing to resolve the swelling phenomenon caused by increased internal pressure have been proposed. As an example, Korean Patent Application Publication No. 2009-0060497 discloses a pouch-type secondary battery equipped with a safety vent prepared by making fine holes on a metal plate used as an electrode tab such that a gas generated inside the battery can be expectably and easily vented under a battery abuse situation.

Although such gas venting is effective in decreasing the internal pressure of the battery, it is limited in resolving the basic cause of internal pressure increase such as overcharge, etc. That is to say, even after the gas is vented, overcharging from outside is continued because the electrode assembly and the electrode tab remain connected.

For cylindrical and prismatic secondary batteries, an overcharge safety device such as a CID (current-interrupting device) can be used because they employ rigid packaging materials. When the internal pressure of the battery is increased due to a gas generated by overcharging, the CID is operated and, at the same time, the electrode assembly is separated from the electrode tab, thereby interrupting current. For the pouch-type secondary battery, however, it is difficult to use the CID because easily shapeable packaging materials are used.

Therefore, development of a method for fundamentally resolving the problems caused by overcharging and greatly improving safety by interrupting current when a swelling phenomenon occurs in a pouch-type secondary battery due to overcharge, etc. is necessary.

DISCLOSURE

Technical Problem

The present disclosure is designed to solve the above-described problems of the related art, and therefore the present disclosure is directed to providing a pouch-type secondary battery which is capable of ensuring safety by interrupting current when the internal pressure of the battery is increased.

Technical Solution

The inventors of this application have conducted extensive researches and experiments to solve the problems described above. As a result, they have developed a pouch-type secondary battery by changing the configurations of an electrode lead and a sealant and found out that, through this, overcharge safety is greatly improved when swelling of the pouch-type secondary battery occurs as the electrode lead breaks by the stress applied to a pouch housing caused by increased internal pressure and, therefore, electric current is interrupted.

The pouch-type secondary battery according to the present disclosure comprises an electrode assembly equipped with an electrode tab, an electrode lead connected to the electrode tab, a pouch housing accommodating and sealing the electrode assembly such that the electrode lead is exposed partly, a first sealant interposed between the top surface of the electrode lead and the inner surface of the pouch housing and a second sealant interposed between the lower surface of the electrode lead and the inner surface of the pouch housing, wherein the electrode lead includes a joint portion joined to the electrode tab, a terminal portion exposed to the outside of the pouch housing and a fuse portion between the joint portion and the terminal portion, the fuse portion includes a separating groove including a horizontal slit at the center thereof which is in parallel to the width direction of the electrode lead and a breaking portion connected to the separating groove for separating the terminal portion from the joint portion and the shapes of the first sealant and the second sealant are different from each other such that, when the pressure inside the secondary battery is increased, the stress applied to the pouch housing is in opposite directions at the top surface and the lower surface of the electrode lead so that the breaking portion breaks.

In a specific exemplary embodiment, the terminal portion of the electrode lead is completely separated from the remaining portion of the electrode lead in opposite directions as the breaking portion breaks.

In the present disclosure, the pouch housing is equipped with a sealing zone at its edge, the horizontal slit is separated from the sealing zone toward the joint portion and the breaking portion is formed inside the sealing zone. The first sealant may be formed on the electrode lead above the horizontal slit and the second sealant may be formed on the electrode lead on both sides of the horizontal slit.

For example, the first sealant may be formed in the form of a band crossing the top surface of the electrode lead to be adhered to the pouch housing and may have a portion protruding toward the horizontal slit so as to cover the top surface of the electrode lead above the horizontal slit. The second sealant may be formed in the form of a band crossing the lower surface of the electrode lead to be adhered to the pouch housing and may have protruding portions such that it can be formed on the lower surface of the electrode lead outside the vertical slit.

In an exemplary embodiment, the joint portion may have a larger width than the terminal portion. In this case, the horizontal slit may have a length which is the same as the width of the terminal portion. In that case, the separating groove may further include a vertical slit at both ends of the horizontal slit, which is perpendicular to the width direction of the electrode lead and faces the terminal portion, and the breaking portion may be positioned along a line extending from the vertical slit to face the terminal portion.

In another exemplary embodiment, the horizontal slit may have a length which is shorter than the width of the terminal portion, the separating groove may further include a slant slit at both ends of the horizontal slit, which faces the terminal portion, and the breaking portion may be positioned along a line extending from the slant slit to face the terminal portion.

In the present disclosure, a notch may be formed in the breaking portion. The notch may be formed in at least one of the top surface and the lower surface of the electrode lead. The notch may have at least one shape of a wedge shape, a rounded shape and a square shape. The breaking portion may have one or more through-hole formed therein.

In the present disclosure, the electrode lead may be at least one of a cathode lead and an anode lead.

In another exemplary embodiment, the front end of the breaking portion may be cut partly. In this case, the separating groove may further include a connecting portion. The connecting portion may be formed at the center of the horizontal slit. A notch may be formed in the connecting portion and the notch may be formed in at least one of the top surface and the lower surface of the electrode lead. The notch may have at least one shape of a wedge shape, a rounded shape and a square shape. Instead of the notch, one or more through-hole may be formed in the connecting portion. The front end of the breaking portion may be cut inside the sealing zone and the rear end of the breaking portion may be formed to protrude toward the electrode assembly beyond the sealing zone.

Advantageous Effects

The present disclosure proposes an electrode lead structure capable of interrupting current in an overcharge situation for a pouch-type secondary battery like the CID of a cylindrical or prismatic battery. According to the present disclosure, cell safety can be ensured by adding to a pouch-type secondary battery a current interrupting function in response to increased internal pressure. Accordingly, when used in vehicles and compact electronic products, the pouch-type secondary battery can effectively cope with a safety problem caused by overcharge or abnormal use.

According to the present disclosure, even when abnormalities such as overcurrent flow in the pouch-type secondary battery occur due to the malfunction of a protection circuit, the safety of the secondary battery during use can be ensured by making the electrode lead break quickly.

The present disclosure is advantageous in that, by changing the configurations of an electrode lead and a sealant from those of the existing pouch-type secondary battery, when overcharge or swelling occurs, the electrode lead breaks by small force and the broken parts are completely separated from each other and, therefore, electric current is interrupted.

Also, there is an advantage in that the secondary battery can be manufactured through a very facile and simple process, unlike the complicated method of forming a safety vent, etc., by changing the configurations of the electrode lead and the sealant.

In particular, when the front end of a breaking portion is partly cut as an exemplary embodiment of the present disclosure, the breaking distance is further decreased and faster current interruption is possible when restricting current path after the breaking. In this case, a current path can be additionally secured by including a separating groove in a connecting portion.

DESCRIPTION OF DRAWINGS

The accompanying drawings illustrate specific exemplary embodiments of the present disclosure and, together with the foregoing disclosure, serve to provide further understanding of the technical features of the present disclosure. Thus, the present disclosure is not construed as being limited to the drawings.

BEST MODE

Figure 1:
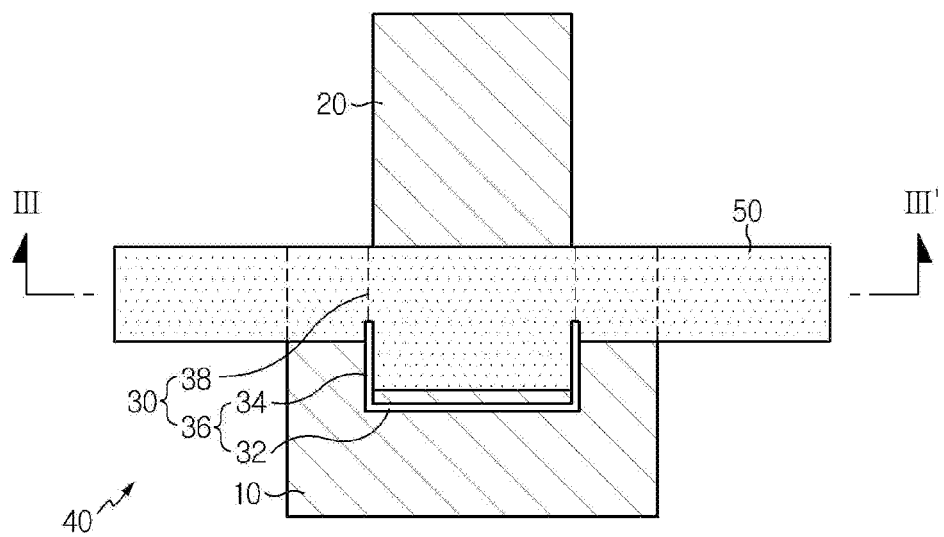
FIG. 1 is a top view of an electrode lead according to an exemplary embodiment of the present disclosure.

Hereinafter, specific exemplary embodiments of the present disclosure are described in detail referring to the accompanying drawings. However, the present disclosure is not limited to the exemplary embodiments described below but may be embodied in various different forms. The exemplary embodiments are provided so that the present disclosure is complete and the scope of the present disclosure is completely understood by those of ordinary skill. In the drawings, the shapes, etc. of elements may be exaggerated for clarity and like numerals represent like elements.

Because the secondary batteries of different types show different physical properties during overcharge, methods for improving their safety are also different. In the present disclosure, an electrode lead of a pouch-type secondary battery is improved such that the electrode lead breaks when internal pressure is increased and the configuration of a sealant is changed such that the broken parts are completely separated from each other with ease.

The present disclosure provides an electrode lead structure capable of interrupting current in an overcharge situation even for a pouch-type secondary battery, like the CID of a cylindrical or prismatic battery. The present disclosure can ensure cell safety by adding to a pouch-type secondary battery a current interrupting function in response to increased internal pressure.

When a secondary battery is exposed to an abnormal use environment during use, the following physical and chemical phenomena occur. The safety devices used to ensure safety are triggered by such physical/chemical phenomena.

Increase in temperature and gas generation due to reactions between cathode, anode and electrolyte.

Voltage increase beyond permitted limit.

Deformation of cell due to difference in internal and external pressure.

Similarly to the operation mechanism of the existing CID, the present disclosure is directed to interrupting current using stress caused by the increased internal pressure of the secondary battery.

When a pouch housing of a pouch-type secondary battery is swollen due to overcharge, the risks of overcharge may be greatly reduced by separating an electrode tab protruding from an electrode assembly from an electrode lead connected thereto or by breaking the electrode lead itself and thereby interrupting a current path. The present disclosure can fundamentally resolve the risks of overcharge by interrupting electrical current through complete separation of the electrical connection, rather than partial breaking of the connection.

Figure 2:
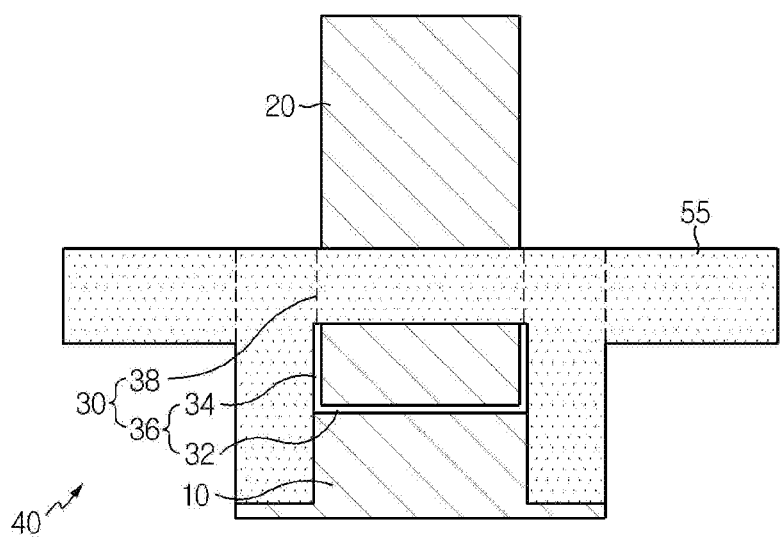
FIG. 2 is a bottom view and FIG. 3 is a cross-sectional view along the line in FIG. 1.
Figure 3:
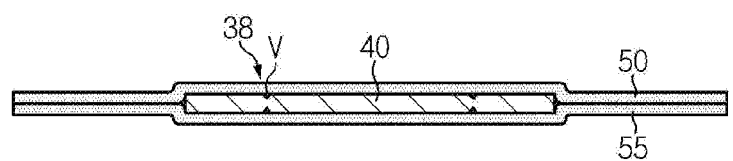

FIG. 1 is a top view of an electrode lead according to an exemplary embodiment of the present disclosure. FIG. 2 is a bottom view and FIG. 3 is a cross-sectional view along the line in FIG. 1. A sealant used together with the electrode lead when assembling a secondary battery is also illustrated in the figures.

As shown in FIGS. 1-3, the electrode lead according to the present disclosure has a shape different from the existing electrode lead with a rectangular structure, e.g., a shape of inverted T. Not only the shape of the electrode lead, the configuration of the sealant is also changed such that the electrode lead can break easily when pouch housing is deformed due to increased internal pressure.

The electrode lead 40 of the present disclosure is made of a metal serving as a current path. Any metal having conductivity may be used. The electrode lead 40 includes a joint portion 10 joined to an electrode tab (not shown), a terminal portion terminal portion 20 exposed to the outside of a pouch housing (not shown) and a fuse portion 30 between the joint portion 10 and the terminal portion 20.

The fuse portion 30 includes a separating groove 36 including a horizontal slit 32 at the center thereof which is in parallel to the width direction of the electrode lead 40. And, a breaking portion 38 connected to the separating groove 36 for separating the terminal portion 20 from the joint portion 10 is formed.

The slit is narrow and long basically and, in the present disclosure, horizontal means a direction parallel to the width direction (horizontal direction in the figures) of the electrode lead 40. The separating groove 36 serves to partly separate the terminal portion 20 from the joint portion 10 physically while maintaining electrical connection, so that the joint portion 10 can be completely separated from the terminal portion 20 when the breaking portion 38 breaks.

In an exemplary embodiment, the joint portion 10 may have a larger width than the terminal portion 20. In this case, the horizontal slit 32 may have a length which is the same as the width of the terminal portion 20. In that case, the separating groove 36 may further include a vertical slit 34 at both ends of the horizontal slit 32, which is perpendicular to the width direction of the electrode lead 40 and faces the terminal portion 20. And, the breaking portion 38 may be positioned along a line extending from the vertical slit 34 to face the terminal portion 20. The vertical slit 34 serves, together with the horizontal slit 32, to provide flexibility vertically and sideways to the bottom end of the terminal portion 20 and serves to make breaking easily by decreasing the length of the breaking portion 38. In particular, when the pouch housing is deformed due to external force, the external force may be concentrated on the end portion of the vertical slit 34 so that breaking can occur by the breaking portion 38 connected to the end portion of the vertical slit 34. When breaking occurs as a result, the terminal portion 20 is separated from the remaining portion of the electrode lead 40 in the form of a rectangular shape.

The lengths of the vertical slit 34 and the breaking portion 38 may be changed variously. When the vertical slit 34 is relatively longer and the breaking portion 38 is relatively shorter, although the breaking may occur easily with weak force, the current path is shortened and the breaking portion 38 may occur under an undesired situation if the current is not concentrated at the breaking portion 38. On the contrary, when the vertical slit 34 is relatively shorter and the breaking portion 38 is relatively longer, although the current path can be ensured, strong force is required to break the breaking portion 38. Therefore, the lengths of the vertical slit 34 and the breaking portion 38 are determined in consideration of various factors.

Their lengths are also related with the position of the horizontal slit 32. When the horizontal slit 32 is formed close to the joint portion 10 and the bottom end of the electrode lead 40, their lengths should also be increased. In addition, the problem that it is difficult to ensure a sufficient area of the joint portion 10 should also be considered. When the lengths of the horizontal slit 32 and the vertical slit 34 are too short, it is difficult to expect the effect derived from the slit formation. On the contrary, when the lengths are too long, stress may be concentrated on the slits 32, 34 in the separating groove 36 and breaking of the electrode lead 40 may occur there undesirably.

The electrode lead 40 according to the present disclosure has the separating groove 36 formed between the joint portion 10 and the terminal portion 20 and the joint portion 10 is separated from the terminal portion 20 physically and electrically by the breaking portion 38 extending from the separating groove 36. The separating groove 36, which forms a void space, may include the horizontal slit 32 and the vertical slit 34, the horizontal slit 32 alone or a combination of the horizontal slit 32 and a void space, as shown in the figures. The separating groove 36 may have a shape suitable to separate the joint portion 10 from the terminal portion 20 in order to ensure electrical interruption by the fuse portion 30. Most specifically, it may include both the horizontal slit 32 and the vertical slit 34. For example, the separating groove 36 may be formed by using a roll equipped with a cutter on the surface thereof, a frame equipped with a cutter, etc., although not being limited thereto. It may be formed in the beginning when the electrode lead 40 is formed by molding.

In order to allow easy breaking of the desired portion, a notch V may be formed in the breaking portion 38 as shown in the cross-sectional view FIG. 3. The notch V may serve to the position where breaking occurs as stress is concentrated and propagated. Therefore, when the notch V is formed, the terminal portion 20 may be separated with a desired shape.

Figure 4:
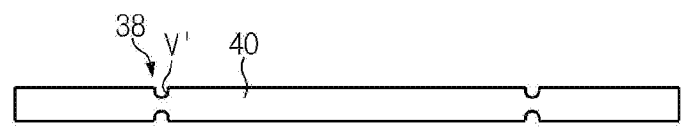
FIG. 4 and FIG. 5 illustrate notches of various shapes that can be formed on a breaking portion of an electrode lead according to exemplary embodiment of the present disclosure.
Figure 5:
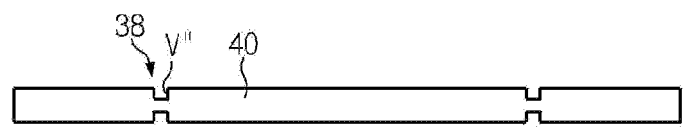

As shown in FIG. 3, the notch V may be the notch formed in both the top surface and the lower surface of the electrode lead 40 and may also be formed in only one of the top surface and the lower surface. Although the notch V shown in FIG. 3 has a wedge shape, a notch V' with a rounded shape or a notch V" with a square shape may also be formed as shown in FIG. 4 and FIG. 5, respectively. In FIG. 4 and FIG. 5, the notch V', V" is shown to be formed in the top surface of the electrode lead 40. However, the notch V', V" may be formed in both the top surface and the lower surface and may also be formed in the lower surface only. The notches V, V', V" may be formed by molding.

A sealant 50, 55 is a member adhered to the pouch housing and may also be called a sealing tape because it has a shape of a tape. The sealant 50, 55 is adhered to the pouch housing through thermal bonding. A first sealant 50 interposed between the top surface of the electrode lead 40 and the inner surface of the pouch housing and a second sealant 55 interposed between the lower surface of the electrode lead 40 and the inner surface of the pouch housing have different shapes.

The first sealant 50 is formed in the form of a band crossing the top surface of the electrode lead 40 to be adhered to the pouch housing and, in particular, has a portion protruding toward the horizontal slit 32 so as to cover the top surface of the electrode lead 40 above the horizontal slit 32. It is not formed on the electrode lead 40 below the horizontal slit 32. And, when the vertical slit 34 reaches up to the sealing portion, an indented portion may be formed so as not to cover the vertical slit 34. The second sealant 55 is also formed in the form of a band crossing the lower surface of the electrode lead 40 to be adhered to the pouch housing and, in particular, is also formed on the lower surface of the electrode lead 40 on both sides of the horizontal slit 32. That is to say, it includes protruding portions such that it can be formed on the lower surface of the electrode lead 40 outside the vertical slit 34.

As a result, the first sealant 50 is adhered to the top surface of the electrode lead 40 above the horizontal slit 32 and the second sealant 55 is adhered to the lower surface of the electrode lead 40 below the horizontal slit 32.

In general, the sealant may be provided in the form of a tape. The tape sealant may be attached horizontally to the top surface of the electrode lead 40 and to the top surface of the electrode lead 40 above the horizontal slit 32, and attached horizontally to the lower surface of the electrode lead 40 and vertically to the lower surface of the electrode lead 40 outside the vertical slit 34. Then, the separating groove 36 may be formed by punching to obtain the first and second sealants 50, 55 shown in the figures. Alternatively, the separating groove 36 may be formed first and then the tape sealant may be attached.

The sealant 50, 55 is formed of a film having insulating and thermal bonding properties. For example, the sealant 50, 55 may be formed of one or more layer (single layer or multiple layers) of a material selected from polyimide (PI), polypropylene (PP), polyethylene (PE), polyethylene terephthalate (PET), etc. The sealant 50, 55 serves not only to prevent short circuits between the electrode lead 40 and a metal layer, e.g., an aluminum sheet, of the pouch housing but also to prevent leakage of an electrolyte, etc. by improving the sealing of the pouch housing. In particular, the sealants 50, 55 of the present disclosure allow easy breaking and separation of the electrode lead 40 because they have different shapes to be formed on different positions above and below the electrode lead 40, as shown in FIG. 1 and FIG. 2.

Figure 6:
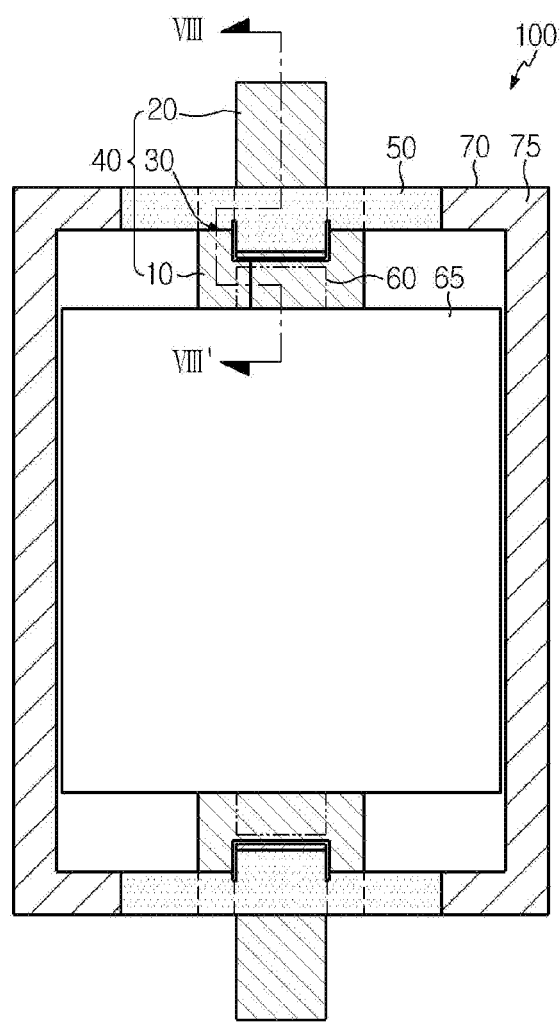
FIG. 6 is a top view of a secondary battery according to exemplary embodiment of the present disclosure and FIG. 7 is a bottom view of the secondary battery.
Figure 7:
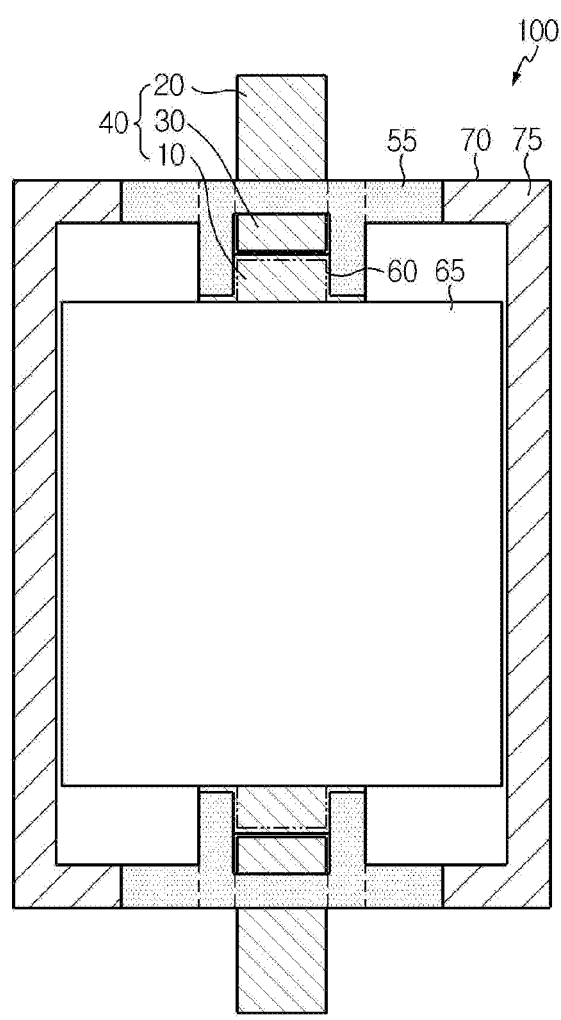

FIG. 6 and FIG. 7 shows a secondary battery including the electrode lead. FIG. 6 is a top view and FIG. 7 is a bottom view of the secondary battery.

The pouch-type secondary battery 100 according to the present disclosure is composed of an electrode assembly 65 having a cathode/separator/anode structure and a pouch housing 70 formed as a laminate sheet accommodating the electrode assembly 65. The cathode or the anode is prepared by coating an electrode active material capable of intercalating and deintercalating lithium ions on a thin plate-type metal current collector such as aluminum, copper, etc. and then drying the same. The electrode assembly 65 may be a stack type, a folding type, a stack-folding type, a jelly-roll type, etc.

The electrode assembly 65 is equipped with an electrode tab 60. The current collector of the electrode assembly 65 may consist of a portion coated with the electrode active material and a portion not coated with the electrode active material (hereinafter, referred to as an "uncoated portion") and the electrode tab 60 may be formed by cutting the uncoated portion or by connecting a conducting member to the uncoated portion by ultrasonic welding, etc. As shown in the figures, the electrode tab 60 may protrude in two directions of the electrode assembly 65 to face each other or may protrude in direction to be parallel to each other.

The electrode tab 60 serves as an electron transfer path inside and outside the battery. The electrode lead 40 described referring to FIGS. 1-3 is connected to the electrode tab 60 by spot welding, etc. The electrode lead 40 may extend along the same or opposite directions depending on the positions where a cathode tab and an anode tab are formed. A cathode lead and an anode lead may be made of different materials. That is to say, the cathode lead may be made of aluminum (Al) as a cathode plate and the anode lead may be made of copper (Cu) or nickel (Ni)-coated copper as an anode plate. Finally, the electrode lead 40 is electrically connected to an external terminal via the terminal portion 20.

The pouch housing 70 accommodates and seals the electrode assembly 65 such that a part of the electrode lead 40, i.e., the terminal portion 20, is exposed. The first and second sealants 50, 55 described above are disposed between the electrode lead 40 and the pouch housing 70.

The pouch housing 70 is equipped with a sealing zone 75 at its edge and the horizontal slit 32 of the electrode lead 40 is separated from the sealing zone 75 toward the joint portion 10. That is to say, when the electrode lead 40 has a shape of inverted T, the leg portion of the T protrudes outside the pouch housing 70 and the head portion of the T is formed partly in the sealing zone 75. The breaking portion 38 is formed in the sealing zone 75. The first sealant 50 is formed in the sealing zone 75 and on the electrode lead 40 above the horizontal slit 32, and the second sealant 55 is formed in the sealing zone 75 and on the electrode lead 40 on both sides of the horizontal slit 32.

Because the first sealant 50 and the second sealant 55 have different shapes as described above, when the internal pressure of the secondary battery 100 is increased, stress applied to the pouch housing 70 may be exerted in opposite directions to the top surface and the lower surface of the electrode lead 40 and, thus, the breaking portion 38 may break.

The breakable electrode lead 40 may be applied to both the cathode lead and the anode lead or to one of them. In general, aluminum is used for a cathode current collector and copper is used for an anode current collector. When swelling occurs, a copper foil tends to break more easily than an aluminum foil. Therefore, the anode lead may be more breakable than the cathode lead. In that case, the anode lead may be formed as the breakable electrode lead 40.

As shown in FIG. 6 and FIG. 7, because the first and second sealants 50, 55 disposed between the electrode lead 40 and the pouch housing 70 have different shapes, the portions sealed by the first and second sealants 50, 55 are different as the top surface and the lower surface of the secondary battery 100. Because the electrode lead 40 breaks due to the stress applied to the pouch housing 70, the sealing is set to be different with respect to the portion where the breaking occurs, i.e., the breaking portion 38.

Figure 8:
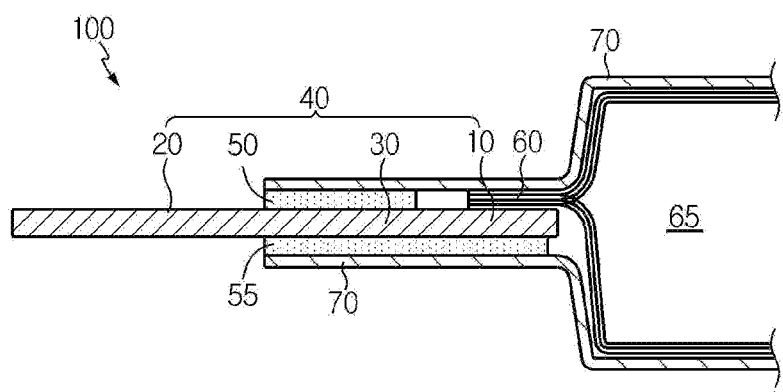
FIG. 8 is a cross-sectional view along the line VIII-VIII' in FIG. 6 showing a normal state.
Figure 9:
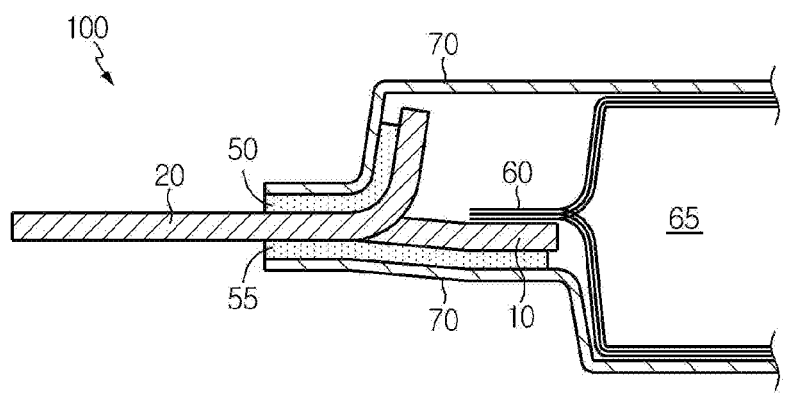
FIG. 9 shows a state wherein the secondary battery of FIG. 8 is swollen due to increased internal pressure.

FIG. 8 is a cross-sectional view along the line VIII-VIII' in FIG. 6 showing a normal state. FIG. 9 shows a state wherein the pouch-type secondary battery of FIG. 8 is swollen due to increased internal pressure.

In FIG. 8, the electrode tab 60 is a portion where the uncoated portions of the current collector are welded together. It is shown that the joint portion 10 of the electrode lead 40 is welded to the electrode tab 60.

When the pouch-type secondary battery 100 is overcharged due to an abnormal situation occurring in the pouch-type secondary battery 100, the internal pressure of the pouch-type secondary battery 100 is increased due to gas generation caused by increased temperature, etc. As a result, the pouch-type secondary battery 100 swells. When this swelling phenomenon occurs, the pouch housing 70 is deformed and the electrode lead 40 adhered to the pouch housing 70 is also deformed in the same direction as the pouch housing 70.

As shown in the figures, the electrode lead 40 adhered to the upper and lower surfaces of the pouch housing 70 by the first and second sealants 50, 55 is deformed in opposite directions. The resulting stress leads to breaking of the breaking portion 38, specifically at the interface where the notch V is formed.

That is to say, the force applied as the pouch housing 70 swells allows the electrode lead 40 to be broken and separated more easily, thereby interrupting further current flow and preventing extreme situations. As a result, safety is improved. Therefore, unlike the existing electrode tab which breaks only partly when the swelling phenomenon occurs, the terminal portion 20 of the electrode lead 40 is completely separated easily from the remaining portion of the electrode lead 40. Therefore, the electrode lead 40 of the present disclosure can perform a function similar to that of the CID of a cylindrical battery, etc.

Figure 10:
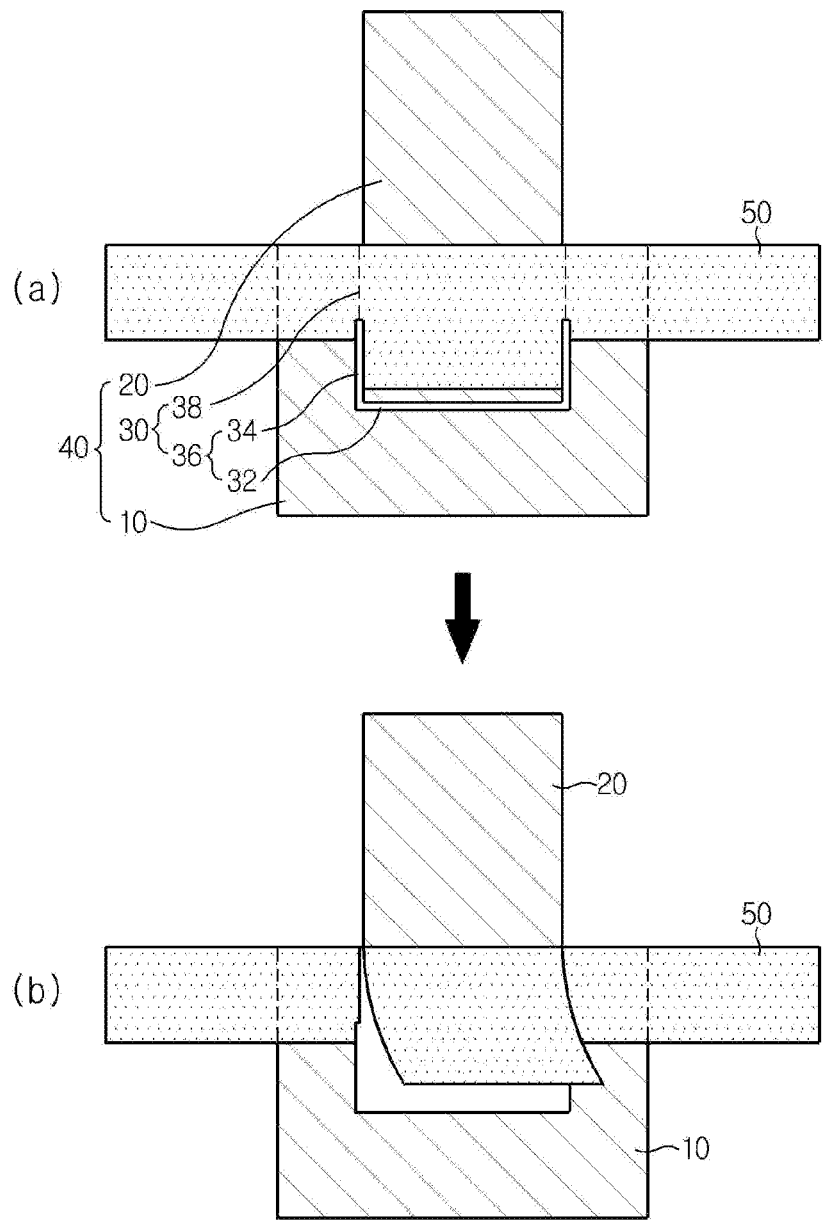
FIG. 10 shows an electrode lead before and after breaking.

FIG. 10 shows the electrode lead 40 before and after the breaking. It can be seen that the current path is interrupted by the breaking. As the breaking portion 38 breaks, the terminal portion 20 of the electrode lead 40 is completely separated from the remaining portion of the electrode lead 40 in opposite directions and the current is completely interrupted. The terminal portion 20 of the electrode lead 40 is pulled upwardly by the first sealant 50 and the remaining portion is pulled downwardly by the second sealant 55. That is to say, in the present disclosure, by changing the configurations of the electrode lead 40 and the sealant 50, 55, the electrode lead 40 itself can be made to break by small force and be completely separated from the terminal portion 20 and the remaining portion easily, thereby interrupting further current flow and ensuring overcharge safety.

As such, according to the present disclosure, when the internal pressure is increased, the electrode lead breaks due to the stress applied to the pouch housing and the electric current is interrupted.

Figure 11:
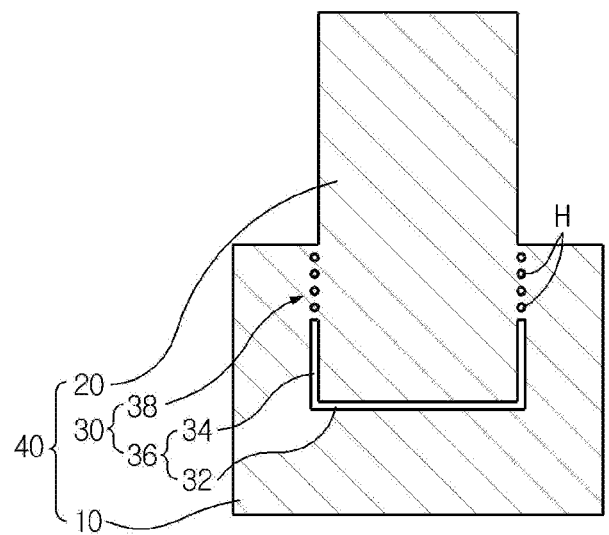
FIGS. 11-13 are top views of various electrode leads according to other exemplary embodiments of the present disclosure.

FIG. 11 shows another exemplary embodiment in which the shape of the breaking portion 38 is different from that of FIG. 1. One or more through-hole H may be formed in the breaking portion 38. Also in this case, if the electrode lead 40 is adhered to the upper and lower surfaces of the pouch housing using first and second sealants with different configurations, the electrode lead 40 is deformed in opposite directions. Due to the resulting stress, the breaking portion 38 breaks along a narrow gap between the through-holes H.

Figure 12:
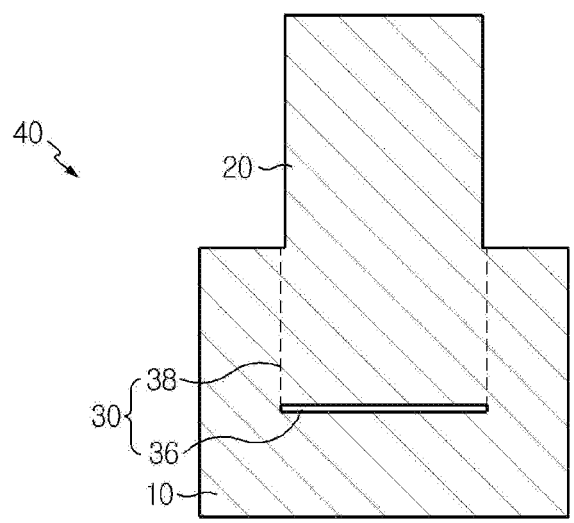

FIG. 12 shows another exemplary embodiment of the electrode lead.

The exemplary embodiment shown in FIG. 12 does not have the vertical slit 34. The breaking portion 38 may have a notch or a through-hole formed therein as in the foregoing exemplary embodiments.

Figure 13:
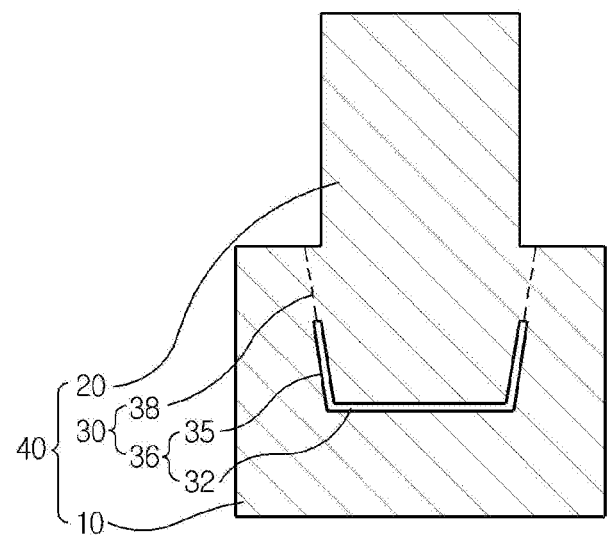

FIG. 13 shows another exemplary embodiment.

In FIG. 13, the electrode lead 40 is illustrated to have a shape of inverted T. But, it may also have a rectangular shape. The horizontal slit 32 has a length which is shorter than the width of the terminal portion 20. The separating groove 36 further includes a slant slit 35 at both ends of the horizontal slit 32, which faces the terminal portion, 20. The breaking portion 38 is positioned along a line extending from the slant slit 35 to face the terminal portion 20. Also in this case, the breaking portion 38 may have a notch or a through-hole formed therein as in the foregoing exemplary embodiments. The slant slit 35 may be a slit slanted with a predetermined angle depending on the width of the terminal portion 20, width of the horizontal slit 32, etc. As an alternative embodiment, a slit curved with a predetermined radius of curvature (curved slit) may be formed between the horizontal slit 32 and the breaking portion 38.

Figure 14:
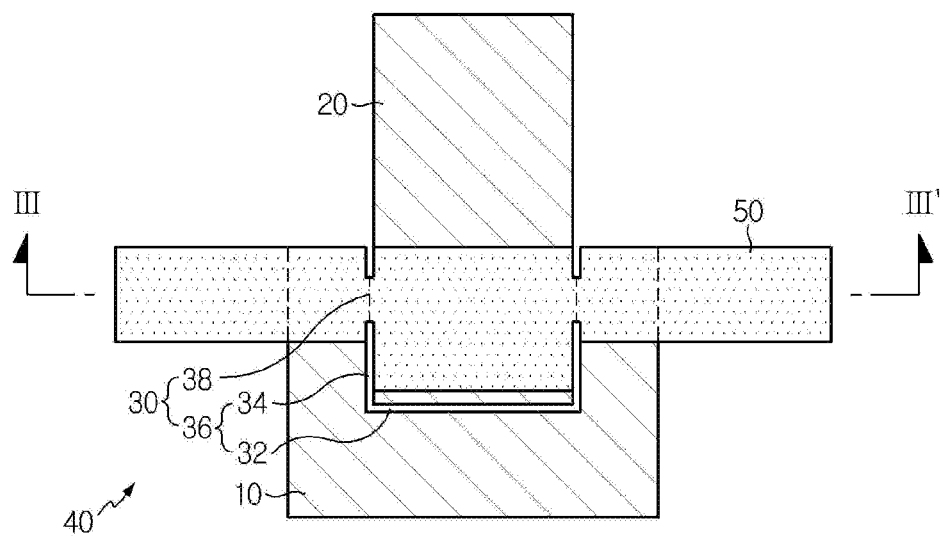
FIG. 14 is a top view of an electrode lead according to another exemplary embodiment of the present disclosure and FIG. 15 is a bottom view.
Figure 15:
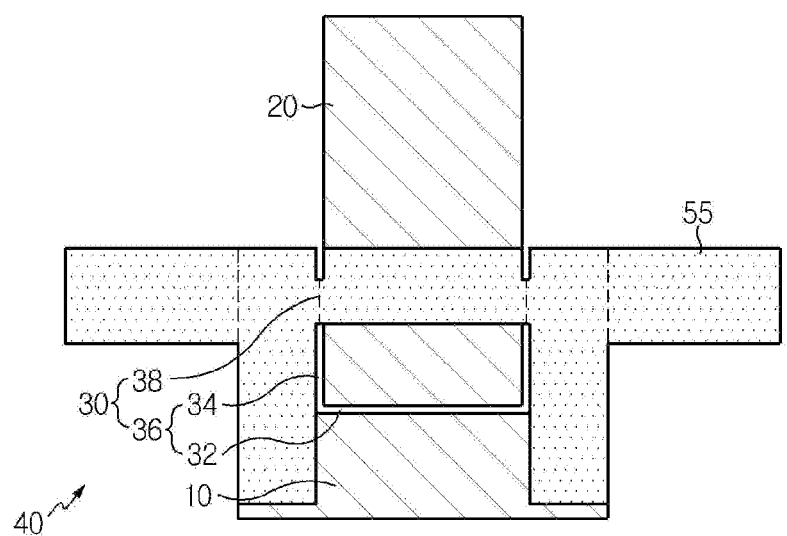
Figure 16:
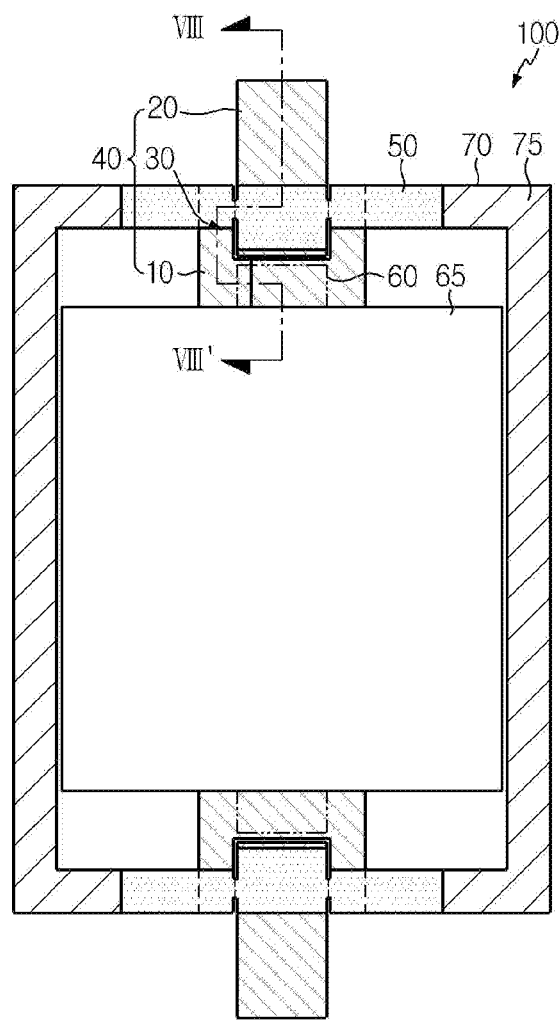
FIG. 16 is a top view of a secondary battery according to another exemplary embodiment of the present disclosure and FIG. 17 is a bottom view of the secondary battery.
Figure 17:
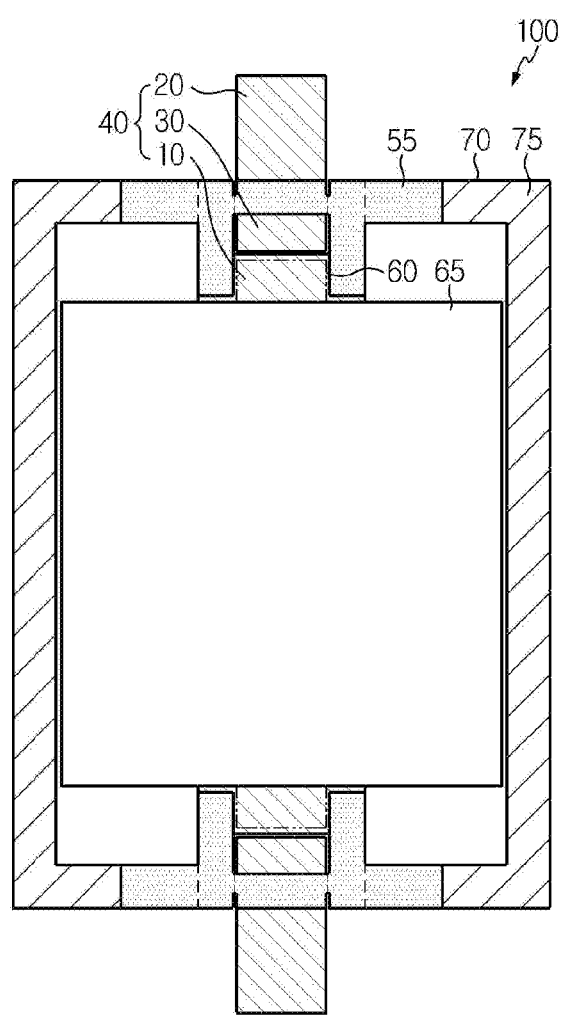

FIG. 14 is a top view of an electrode lead according to another exemplary embodiment of the present disclosure and FIG. 15 is a bottom view. FIG. 16 is a top view of a secondary battery according to another exemplary embodiment of the present disclosure and FIG. 17 is a bottom view of the secondary battery.

These exemplary embodiments are identical to the exemplary embodiments described referring to FIGS. 1-10 except that the front end of the breaking portion 38 is cut partly. The cross section along the line of FIG. 14 may be the same as those of FIGS. 3-5, the cross section along the line VIII-VIII' of FIG. 16 showing a normal state may be the same as that of FIG. 8 and that showing a swollen state may be the same as that of FIG. 9.

For a faster operation in interrupting the current path after the breaking, the breaking distance is decreased in these exemplary embodiments by partly cutting the front end of the breaking portion 38. The degree of cutting may be controlled variously. For example, the degree depth may be controlled such that the current path is ensured by maintaining the length of the breaking portion 38 to some extent and the breaking occurs quickly when the internal pressure of the secondary battery is increased.

As shown in FIG. 16, when the electrode lead according to this exemplary embodiment is applied to the secondary battery 100, the front end of the breaking portion 38 may be cut inside the sealing zone 75 and the rear end of the breaking portion 38 may be formed to protrude toward the electrode assembly 65 beyond the sealing zone 75, i.e., toward the inside of the cell.

Figure 18:
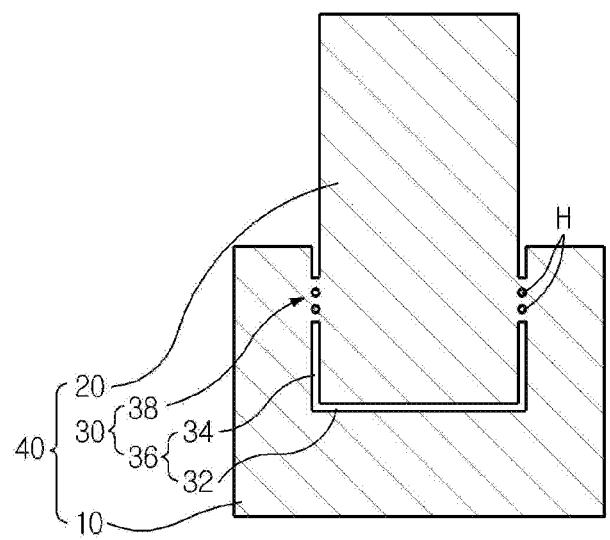
FIGS. 18-20 are top views of various electrode leads according to other exemplary embodiments of the present disclosure.
Figure 19:
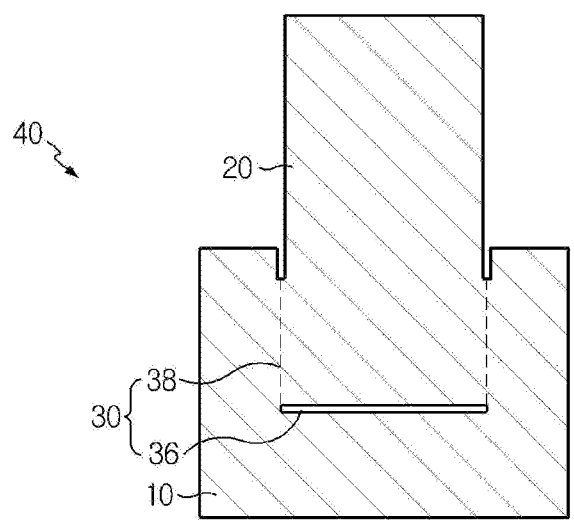
Figure 20:
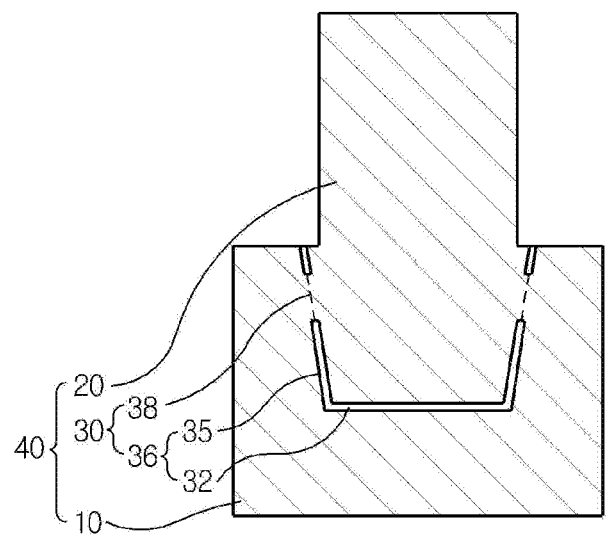

FIGS. 18-20 are top views of various electrode leads according to other exemplary embodiments of the present disclosure.

In the exemplary embodiment illustrated in FIG. 18, the front end of the breaking portion 38 is cut partly as compared to the exemplary embodiment illustrated in FIG. 11. In the exemplary embodiment illustrated in FIG. 19, the front end of the breaking portion 38 is cut partly as compared to the exemplary embodiment illustrated in FIG. 12. And, in the exemplary embodiment illustrated in FIG. 20, the front end of the breaking portion 38 is cut partly as compared to the exemplary embodiment illustrated in FIG. 13.

When there is no vertical slit 34 as in the exemplary embodiment illustrated in FIG. 19, the cut length of the front end of the breaking portion 38 may be longer than when there is a vertical slit 34.

Figure 21:
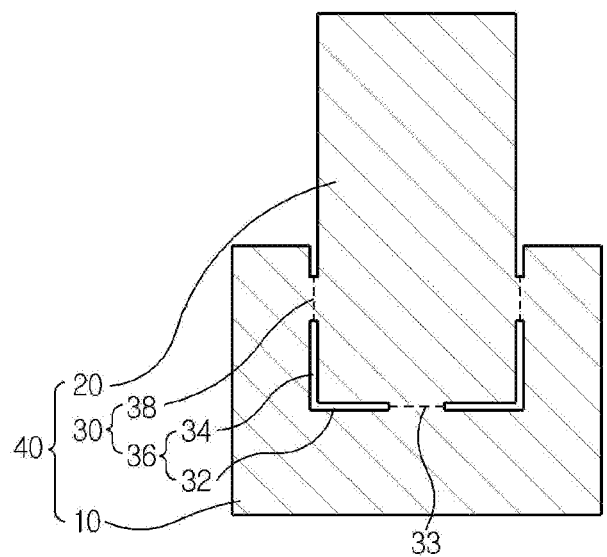
FIG. 21 is a top view of an electrode lead according to another exemplary embodiment of the present disclosure having an additional current path.

FIG. 21 is a top view of an electrode lead according to another exemplary embodiment of the present disclosure having an additional current path.

In the electrode lead 40 of FIG. 21, the front end of the breaking portion 38 is cut partly and the separating groove 36 includes a connecting portion 33. The connecting portion 33 may be included anywhere in the separating groove 36 to provide an additional current path. In this specific exemplary embodiment, it is formed in the horizontal slit 32. The connecting portion 33 is formed at the center of the horizontal slit 32 and constitutes a current path connected to the joint portion 10 and the terminal portion 20. A notch may be formed in the connecting portion 33 such that the position of breaking is determined and the breaking occurs quickly. The notch may be formed with the same or similar shapes and methods as the notches described above referring to FIGS. 3-5. The length of the connecting portion 33 may be controlled variously. The length of the connecting portion 33 may be controlled that the current path is ensure and the breaking occurs quickly when the internal pressure of the secondary battery is increased.

According to this exemplary embodiment, an additional current path may be ensured by the connecting portion 33 in normal state and the current path may be broken by the breaking portion 38 and the separating groove 36 in abnormal state. If the current path is narrow, there are risks of increased resistance in the electrode lead 40 and heat generation. This problem can be solved by further including the connecting portion 33 as in this exemplary embodiment and, thereby, providing an additional current path.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A pouch-type secondary battery comprising:
an electrode assembly equipped with an electrode tab;
an electrode lead connected to the electrode tab;
a pouch housing accommodating and sealing the electrode assembly such that the electrode lead is partially exposed;
a first sealant interposed between a top surface of the electrode lead and an inner surface of the pouch housing; and
a second sealant interposed between a lower surface of the electrode lead and the inner surface of the pouch housing,
wherein the electrode lead is a unitary plate extending in orthogonal length and width directions, the electrode lead comprises a joint portion joined to the electrode tab, a terminal portion exposed to an outside of the pouch housing and a fuse portion between the joint portion and the terminal portion, the electrode lead extending in the length direction from the electrode tab to the outside of the pouch,
wherein the fuse portion comprises a separating through-opening extending through the electrode lead in a height direction of the electrode lead orthogonal to the length and width directions, the separating through-opening comprising a horizontal slit extending in the width direction and surrounded by a central portion of the electrode lead, and a breaking portion connected to the separating through-opening for separating the terminal portion from the joint portion, the breaking portion having areas of reduced thickness in the height direction and extending from opposite ends of the separating through-opening to respective peripheral edges of the electrode lead, and
wherein the first sealant and the second sealant have shapes that are different from each other such that, when pressure inside the secondary battery is increased, a stress applied to the pouch housing is in opposite directions at the top surface and the lower surface of the electrode lead so that the breaking portion breaks.

2. The pouch-type secondary battery according to claim 1, wherein the terminal portion of the electrode lead is completely separated from a remaining portion of the electrode lead such that the terminal portion and the remaining portion move in opposite directions as the breaking portion breaks.

3. The pouch-type secondary battery according to claim 1, wherein the breaking portion has one or more through-holes formed therein.

4. The pouch-type secondary battery according to claim 1, wherein the electrode lead is at least one of a cathode lead and an anode lead.

5. The pouch-type secondary battery according to claim 1, wherein the breaking portion includes a notch formed therein.

6. The pouch-type secondary battery according to claim 5, wherein the notch is formed in at least one of the top surface and the lower surface of the electrode lead.

7. The pouch-type secondary battery according to claim 1, wherein the breaking portion includes a front end that is cut partly.

8. The pouch-type secondary battery according to claim 7, wherein the separating through-opening further comprises a connecting portion.

9. The pouch-type secondary battery according to claim 8, wherein the connecting portion is formed at the center of the horizontal slit.

10. The pouch-type secondary battery according to claim 8, wherein the connecting portion has one or more through-holes formed therein.

11. The pouch-type secondary battery according to claim 8, wherein the connecting portion includes a notch formed therein.

12. The pouch-type secondary battery according to claim 11, wherein the notch is formed in at least one of the top surface and the lower surface of the electrode lead.

13. The pouch-type secondary battery according to claim 1, wherein the pouch housing is equipped with a sealing zone at its edge, the sealing zone positioned so that the horizontal slit is separated from the sealing zone toward the joint portion and the breaking portion is formed inside the sealing zone.

14. The pouch-type secondary battery according to claim 13, wherein the horizontal slit has a length which is shorter than a width of the terminal portion, the separating through-opening further comprises a slant slit at both ends of the horizontal slit, each facing the terminal portion, and the breaking portion is positioned along a line extending from the slant slit to face the terminal portion.

15. The pouch-type secondary battery according to claim 13, wherein the first sealant is formed on the electrode lead above the horizontal slit and the second sealant is formed on the electrode lead on both sides of the horizontal slit.

16. The pouch-type secondary battery according to claim 13, wherein the electrode lead has an inverted T shape, wherein a leg portion of the inverted T protrudes outside the pouch housing and a head portion of the inverted T is formed partly in the sealing zone.

17. The pouch-type secondary battery according to claim 13, wherein the joint portion has a width larger than a width of the terminal portion.

18. The pouch-type secondary battery according to claim 17, wherein the horizontal slit has a length which is the same as the width of the terminal portion.

19. The pouch-type secondary battery according to claim 18, wherein the separating through-opening further comprises a vertical slit at both ends of the horizontal slit, which is perpendicular to the width direction of the electrode lead and faces the terminal portion, and the breaking portion is positioned along a line extending from the vertical slit to face the terminal portion.

20. The pouch-type secondary battery according to claim 19, wherein the first sealant is formed in the form of a band crossing the top surface of the electrode lead to be adhered to the pouch housing and has a portion protruding toward the horizontal slit so as to cover the top surface of the electrode lead above the horizontal slit, and the second sealant is formed in the form of a band crossing the lower surface of the electrode lead to be adhered to the pouch housing and has protruding portions such that it can be formed on the lower surface of the electrode lead outside the vertical slit.

* * * * *